Patented Aug. 1, 1944

2,354,940

UNITED STATES PATENT OFFICE 2,354,940

FUNGICIDE

Roscoe H. Carter, Washington, D. C., and Marion C. Goldsworthy, Takoma Park, Md., assignors to Claude R. Wickard, as Secretary of Agriculture of the United States of America, and his successors in office No Drawing. Application October 20, 1942, Serial No. 462,680

1 Claim. (Cl. 167—33)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a compound useful as a fungicide on plants, seeds, lawns or any surface to be protected against fungi.

An object of this invention is to provide a new and suitable fungicide of superior fungicidal efficiency; to provide a fungicide that does not injure the plants when spread, dusted or painted with a composition containing it; and to provide a fungicidal material that can be used in the usual manner for the preparation of spray fluids, dusts or pastes, and that is reasonable in price and is easily manufactured.

The product of the reaction between two moles of morpholine (tetrahydro 1,4,2-oxazine) in aqueous solution and one mole of carbon disulfide is a compound (described herein as a morpholine salt of the dithiocarbamic acid of morpholine) which, when reacted with iodine or other oxidizing agents, forms the di-morpholine thiuram disulfide, the compound used as the active ingredient in the fungicide of this invention. This compound is yellow in color, and has a melting point of 135–135.5° C. It is insoluble in water and soluble in alcohol, acetone and carbon tetrachloride. For a more detailed description of the compound, reference is made to U. S. Patent No. 2,272,044.

We have found that the compound so formed is toxic to spores of the organisms causing apple scab, apple bitter rot, peach brown rot, and peach scab, and that it is not injurious to the plants on which it is used. We have also found that the compound is compatible with nicotine, nicotine-bentonite, and lead arsenate, and that these may be mixed with it to produce various fungicides of mixed ingredients.

The compound can be powdered and combined with other ingredients to form fungicidal dusts, paints or sprays. For example, it may be mixed with dusting materials such as lime, talc, bentonite, clay, fuller's earth or a combination of those to form a fungicidal dust. Also, suitable spreaders such as powdered soap, casein, or any synthetic aliphatic sulfonate, or adhesives, such as natural fats or waxes, synthetic fats or waxes, mineral or vegetable oils, gums, natural and synthetic resins, glue or paints that are suitable for dusting, may be added. The powdered compositions thus formed may be used as fungicidal dusts, but if fungicidal pastes or paints are required they may be mixed with the necessary amount of water to give them the desired fluidity. A satisfactory spray is formed by mixing two pounds of powdered di-morpholine thiuram disulfide with four pounds of lime or with two pounds of bentonite, or with both lime and bentonite, in 100 gallons of water, although the proportions of this mixture may be varied.

What is claimed is:

A process of combatting fungi comprising applying to the fungi a material containing di-morpholine thiuram disulfide as its active ingredient.

ROSCOE H. CARTER.
MARION C. GOLDSWORTHY.